United States Patent
Chang et al.

(10) Patent No.: US 7,921,142 B2
(45) Date of Patent: Apr. 5, 2011

(54) METHOD AND APPARATUS FOR STORING AND ACCESSING DATA RECORDS ON SOLID STATE DISKS

(75) Inventors: Yuan-Chi Chang, New York, NY (US); Christian Alexander Lang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 11/620,828

(22) Filed: Jan. 8, 2007

(65) Prior Publication Data
US 2008/0168069 A1     Jul. 10, 2008

(51) Int. Cl.
*G06F 7/00* (2006.01)
*G06F 17/30* (2006.01)
(52) U.S. Cl. ....................................... 707/812; 711/171
(58) Field of Classification Search .................. None
See application file for complete search history.

(56) References Cited

U.S. PATENT DOCUMENTS

| 5,918,225 | A | 6/1999 | White et al. |
| 7,567,973 | B1 * | 7/2009 | Burrows et al. ................... 1/1 |
| 2007/0245082 | A1 * | 10/2007 | Margolus et al. ............. 711/114 |
| 2008/0155228 | A1 * | 6/2008 | Sinclair et al. ................ 711/209 |

OTHER PUBLICATIONS

Garcia-Molina et al, Main Memory Database Systems: An Overview, IEEE Transactions on Knowledge and Data Engineering, vol. 4, No. 6, Dec. 1992, pp. 509-516.

Stonebraker et al., "C-Store: A Column-oriented DBMS", Proceedings of the 31st VLDB Conference, Trondheim, Norway, 2005, pp. 553-564.

Ailamaki et al., "Data Page Layouts for Relational Databases on Deep Memory Hierarchies", 2002, The VLDB Journal, 11(3) pp. 1-32.

* cited by examiner

*Primary Examiner* — Uyen T. Le
(74) *Attorney, Agent, or Firm* — Yee & Associates, P.C.; Preston J. Young (57) ABSTRACT

A computer implemented method, computer program product and data processing system, for optimizing a layout of a relational database on a solid state disk. The optimized layout forms multiple column to disk block assignments. Each disk block is assigned substantially the same amount of column data. A column having a size less than a greatest size of any disk block is assigned to one of multiple disk blocks. A column having a size greater than or equal to the greatest size of any disk block is allowed a multiple disk block assignment.

17 Claims, 4 Drawing Sheets

| | RECORD ID | SSN | NAME | AMOUNT |
|---|---|---|---|---|
| 410 → | 1 | 123-45-1111 | SARAH DOE | 7,700 |
| 412 → | 2 | 234-56-2222 | KRIS ADAMS | 8,800 |
| 414 → | 3 | 345-67-3333 | LIZ SOMERS | 9,900 |

| PH | RESERVED | 1 | 123-45-1111 | SARAH DOE | 7,700 |
| 2 | 234-56-2222 | KRIS ADAMS | 8,800 | 3 | 345-67-3333 |
| LIZ SOMERS | 9,900 | | | | |

LAYOUT 500

| A | B | C | D | E | F | G | H |

| 602 → | PH | RESERVED | 1 | 2 | 3 | |
| 604 → | 123-45-1111 | | 234-56-2222 | | 345-67-3333 | |
| 606 → | SARAH DOE | | KRIS ADAMS | | LIZ SOMERS | |
| 608 → | 7,700 | 8,800 | 9,900 | | | |

600

| A | B | C | D | E | F | G | H |

METHOD AND APPARATUS FOR STORING AND ACCESSING DATA RECORDS ON SOLID STATE DISKS

BACKGROUND OF THE INVENTION

1. Field of the Invention

The illustrative embodiments relate generally to an improved data processing system and in particular, to a computer implemented method, data processing system, and computer program product for optimizing the layout of a relational database on a solid state disk.

2. Description of the Related Art

The central concept of a database is that of a collection of records, or pieces of knowledge. Typically, for a given database, there is a structural description of the type of facts held in that database known as a schema. The schema describes the objects that are represented in the database, and the relationships among them. There are a number of different ways of organizing a schema, known as database models or data models. The model in most common use is the relational model, which represents all information in the form of multiple related tables each consisting of rows and columns. This model represents relationships by the use of values common to more than one table. Relational databases are prevalent in applications that require persistent storage of structured data. It is to be appreciated that the term database as used herein is intended to refer to relational database systems such as IBM DB2® which is a product of International Business Machines Corporation, located in Armonk, N.Y., and Oracle 10g® which is a product of Oracle Corporation, located in Redwood, Calif.

An important application of relational databases is business intelligence. A business intelligence workload comprises querying and aggregating large volumes of data records to report and predict business trends. Data records are brought from disks into the main memory of a database server. The speed of the database server, running business intelligence workload, is often determined by the speed of disk input/output (I/O). The speed of disk I/O has been improved with faster interfaces and stripped arrays, however, there is a significant and widening gap between the central processing unit (CPU) speed and disk I/O speed. The performance of a typical business intelligence workload is often limited by the disk I/O speed.

A hard disk is a device that contains a set of one or more magnetic disks on which computer data is stored. The term hard is used to distinguish the disk from a soft, or floppy, disk. The disks or platters for a hard disk are rigid as opposed to the flexible disk in a floppy disk. A single hard disk usually consists of several platters. A hard disk has one or more mechanical disk heads, which must move around on the surface of the disks to access data. Mechanical movement creates significant delay, in particular when data records are not laid out sequentially. Seek time is the time needed to locate data on a disk. The seek time, as measured by the latency of moving disk heads to read non-consecutive data, is orders of magnitude longer for retrieving non-sequential data on a hard drive than the seek time for retrieving sequential data on a hard disk. Therefore, it is typically not desirable to store data records non-sequentially on a hard drive.

The increasingly wider acceptance of solid state disks, also known as flash disks or flash drives, presents new opportunities to narrow the gap between the speed of a CPU and the speed of a disk I/O. Made of flash random access memory (RAM), solid state disks exhibit both faster speed and shorter seek time as compared to a hard disk.

A solid state disk has no mechanical parts. The seek time on a solid state disk is approximately the same as its sequential read/write time. The ratio of seek time versus read/write time on a solid state disk is therefore significantly improved compared to a hard disk.

SUMMARY OF THE INVENTION

The illustrative embodiments described herein provide a computer implemented method, data processing system, and computer program product for optimizing a layout of a relational database on a solid state disk. The optimized layout comprises forming a plurality of column to disk block assignments, wherein each disk block is assigned substantially the same amount of column data. A column having a size less than a greatest size of any disk block is assigned to one of a plurality of disk blocks. A column having a size greater than or equal to the greatest size of any disk block is allowed a multiple disk block assignment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
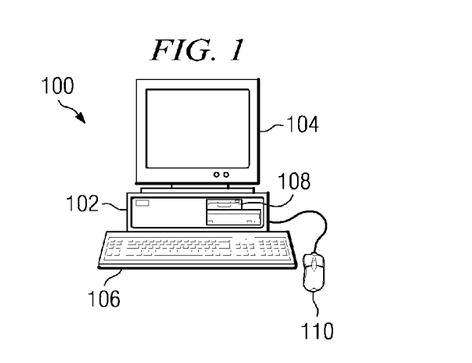
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
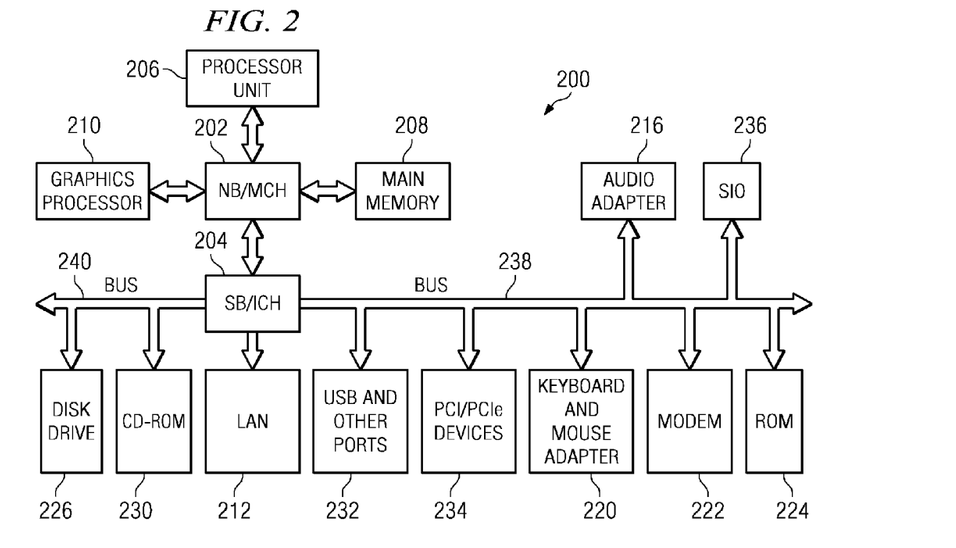
FIG. 2 depicts a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrative embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

A solid state disk, also called a solid state drive, is a data storage device that uses non-volatile memory, such as flash, and volatile memory such as synchronous dynamic random access memory (SDRAM), to store data. This configuration is in contrast to the use of the spinning platters found in conventional hard disk drives. The term solid state disk as used herein is intended to refer to non-volatile storage devices made of solid state technology such as flash RAM and magneto resistive RAM. One or more solid state disks may be used in place of traditional hard disks in a computing environment. While not technically "disks" in any sense, these devices are so named because they are typically used as replacements for disk drives. The illustrative embodiments take advantage of the physical characteristics of solid state disks to achieve significant efficiency over traditional disk layout for business intelligence workloads.

The term disk block as used herein refers to the minimum addressable unit on a disk. Disk interface technologies including integrated drive electronics (IDE), enhanced integrated drive electronics (EIDE) and small computer system interface (SCSI), support a disk block size of 512 bytes. The term disk page, as used herein is intended to refer to the minimum addressable unit by a database. The size of a disk page is always an integer multiple of the size of a disk block. Commercial databases allow database administrators to define the size of the disk page when a new database instance is created. For example, a 4K disk page definition consists of 8 disk blocks.

The illustrative embodiments enable significant reduction of disk I/O in executing business intelligence queries, while maintaining the performance of loading and inserting data records. Particular aspects of the illustrative embodiments include evenly assigning columns in a table to disk blocks on a disk page, inserting a data record by inserting the column values into the assigned disk blocks, reading from disk only requested columns in a query to reduce disk I/O, and deleting a data record by removing the data record column values from the assigned disk blocks. Distributing columns to disk blocks evenly means the total size of one or more columns assigned to a disk block is about the same across all the blocks.

For example, there are four disk blocks and six columns. Columns 1 through 6 have sizes in four bytes, four bytes, eight bytes, six bytes, two bytes, and eight bytes. An even distribution means assigning columns 1 and 2 to block 1, column 3 to block 2, columns 4 and 5 to block 3 and column 6 to block 4. A simple formula is used to add up all column sizes and divide the sum by the number of blocks. This calculation gives the average size per block. Columns are assigned to be approximately equal to the average size. It is also possible for a wide column to be assigned to more than one disk block. Overall, one goal is to minimize wasted space within a page by distributing columns evenly.

There have been implementations in industry and academia with an alternative disk structure layout by columns. A relational record of multiple columns is stored in multiple disk pages. This alternative implementation may not be optimal because the data columns are not evenly distributed across disk blocks on the same disk page. Therefore, the alternate layout improves the performance of retrieving selected columns but actually hampers the performance of inserting and deleting records, due to the necessity of accessing multiple disk pages. Query performance is improved, but at the cost of slower data loading. Therefore, for a data reporting business intelligence workload, the alternate disk structure layout is not optimal.

In contrast, the illustrative embodiments provide for storing a relational record in its entirety on one disk page, while partitioning column data into disk blocks. The data record can then be efficiently accessed in a non-sequential order on a solid state disk. The optimized layout of the illustrative embodiments improves the performance of retrieving selected columns of data and maintains the performance of inserting/deleting records.

Figure 3:
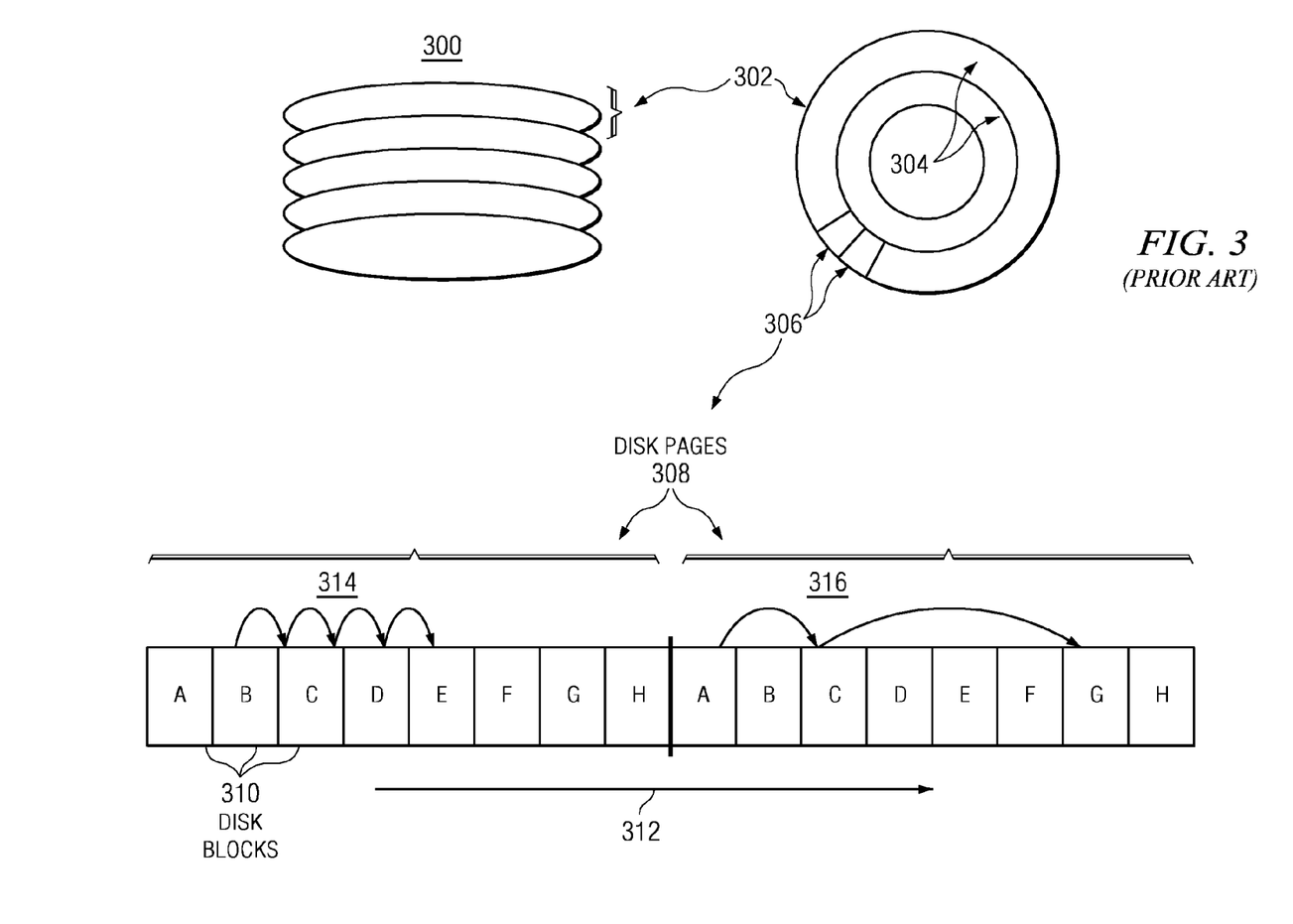
FIG. 3 is a logical view of a prior art hard disk, disk pages, and disk blocks.

Turning now to FIG. 3, a logical view of a prior art hard disk, disk pages, and disk blocks are depicted. Hard disk 300 may have one or multiple spinning magnetic layers, referred to as platters. Platter 302 is divided into tracts tracks. Track 304 is further divided into sectors 306. Sectors 306 are divided into disk pages 308 as defined by the user and disk blocks 310, which are typically the smallest addressable unit on a disk. Modern disk addressing schemes map tracks and blocks 310 into a sequential series of addresses 312. An access to a disk is defined to be sequential if the requested disk blocks are in consecutive order 314. A disk access is non-sequential or random if the requested disk blocks are in non-consecutive order 316. A random access on a hard disk incurs disk head movement, which results in a longer seek time.

Figure 4:
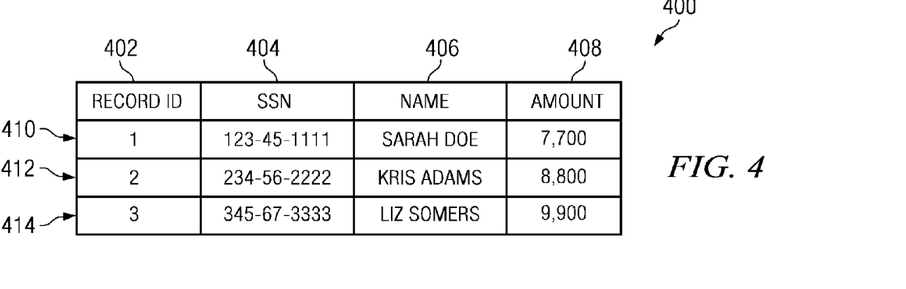
FIG. 4 illustrates an exemplary database table with three data records in which illustrative embodiments may be implemented.

FIG. 4 illustrates an exemplary database table with three data records in which illustrative embodiments may be implemented. In this example, table 400 comprises a personnel data table. The data in table 400 will be used in the structure layouts illustrated in both FIGS. 5 and 6. Table 400 has four columns 402, 404, 406, and 408, and three records 410, 412, and 414. In these examples, records are composed of fields, each field containing one item of information. A set of such records constitutes a file. In this example, the personnel file contains records containing fields that are organized into four columns, including record id 402, SSN 404, name 406, and amount 408. The first record (row 410) contains data in the fields associated with each column. Thus, first record 410 contains the following data 1, 123-45-1111, Sarah Doe, 7,700. Second record 412 contains the following data 2, 234-56-2222, Kris Adams, 8,800. Additionally, third record 414 contains the following data 3, 345-67-3333, Liz Sommers, 9,900.

Figure 5:
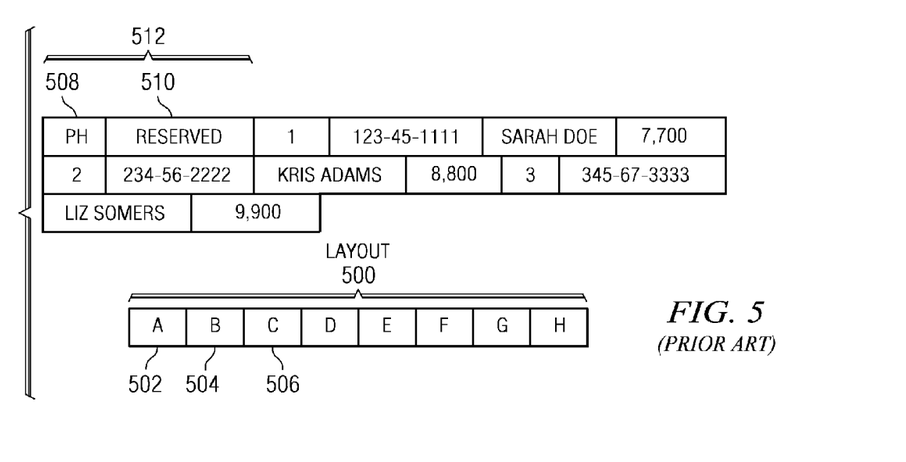
FIG. 5 illustrates a known row structure layout and the associated disk blocks.

FIG. 5 illustrates a known row structure layout and the associated disk blocks. Disk page layout 500 shows a commonly used layout of disk pages in commercial databases. Disk page layout 500 comprises a series of sequentially addressed disk blocks, in this example there are 8 blocks. Block A 502, block B 504, and block C 506 are labeled on disk block layout 500. Above disk page layout 500 is a depiction of fields of data from the example data table found in data table 400 of FIG. 4. The division of the data fields into disk blocks is as indicated. Page header 508 and reserved space 510 form meta data information 512 which is stored in block A 502. After meta data 512, values of a first record, such as element 410 of FIG. 4, are then stored before values of the second row and then the third row, sequentially. Column values belonging to the same row are in consecutive bytes. Therefore, block A 502 contains the meta data, PH and reserved space, in addition to data values 1, 123-45-1111, Sarah Doe, and 7,700. Block B 504 contains the data values 2, 234-56-2222, Kris Adams, 8,800, 3, and 345-67-3333. Block C 506 contains the data values Liz Sommers, 9,900. Data in the same row can span across block boundaries on the same page. For example, data record 3 is stored in part on block B 504 and the remaining part on block C 506. If a user queries layout 500 requesting names, blocks A 502, B 504, and C 506 must be retrieved to satisfy the query.

Figure 6:
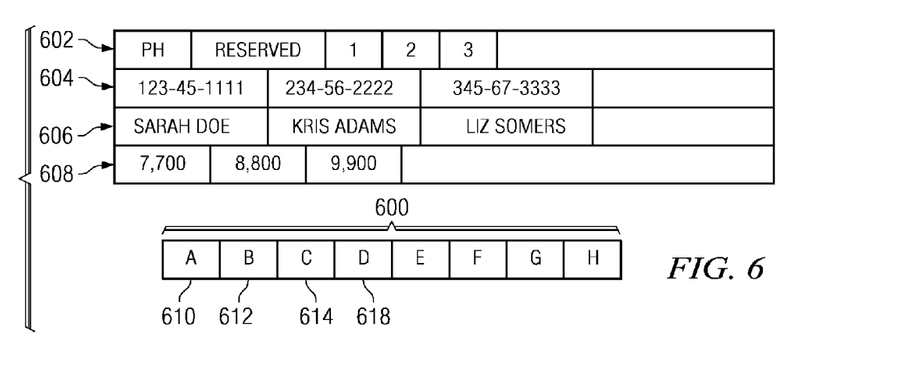
FIG. 6 illustrates the optimized database layout with the columns distributed across the disk blocks in accordance with the illustrative embodiments.

In contrast, FIG. 6 illustrates the optimized database layout with the columns distributed across the disk blocks in accordance with the illustrative embodiments. The same data table as data table 400 of FIG. 4 is used to depict the optimized database layout. The meta data, page header and reserved space are stored on block A 610. In the optimized database layout, however, column values from different records are grouped and stored in a single block. For example, record ID column is stored in block A 610. In other words, the data values depicted in row 602 are contained in block A 610. Therefore, block A 610 contains the meta data, PH and reserved space, in addition to data values 1, 2, and 3. The data values for SSN 604 are contained in block B 612. Therefore, block B contains the data values 123-45-1111, 234-56-2222, and 345-67-3333. The data containing the names 606 is stored in block C 614. The amount column is stored in the block D 618. The database layout keeps a database record within a disk page.

The columns may be distributed in a non-sequential order across the disk blocks within the scope of the illustrative embodiments. Column allocation is discussed further in the steps to create a table in FIG. 7. If a user queries database layout 600 requesting names, only block C 614 must be returned to satisfy the query. Layout 600 has the advantage of requiring less I/O to complete the query than layout 500 of FIG. 5.

The column values are shredded into pre-assigned disk blocks on the disk page. The optimized layout has an advantage because a query asking for record ID and SSN columns only needs to retrieve two disk blocks A 610 and B 612 from the disk page. The prior art layout scheme must take the whole page through the I/O bus. Solid state disks make such an optimization feasible.

Figure 7:
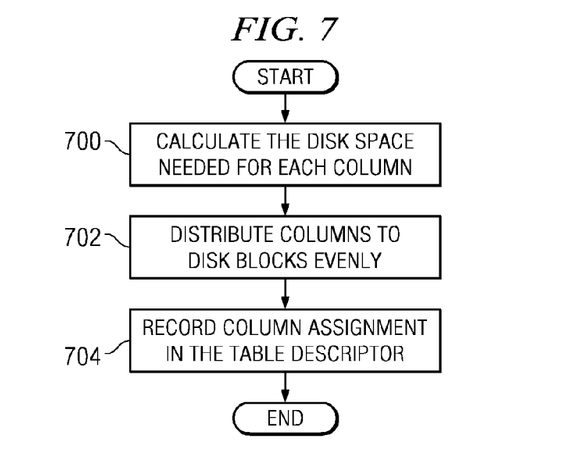
FIG. 7 illustrates the steps to create a table using the optimized structured layout in accordance with the illustrative embodiments.

FIG. 7 illustrates the steps to create a table using the optimized structured layout in accordance with the illustrative embodiments. First step 700 comprises calculating the disk space needed for each column. This calculation may be accomplished in a processor unit, such as processor unit 206 in FIG. 2, or a user implemented calculation in accordance with the illustrative embodiments. Next, the columns are evenly distributed among the disk blocks on a page (step 702). An algorithm may be employed to assign the columns to disk blocks to provide substantially the same amount of column data for each disk block. Simple heuristics may be used to calculate the distribution or the use of optimization algorithms like bin packing may be used. Finally, the mapping assignment of columns to disk blocks may be recorded in the meta data of the table, forming a table descriptor (step 704) with the process terminating thereafter. A table descriptor, as used herein, encompasses any column to disk block table registry.

Figure 8:
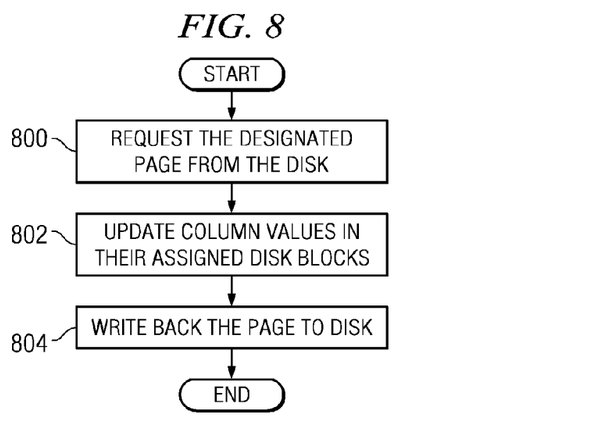
FIG. 8 illustrates maintenance operations such as inserting, updating, and deleting data records in the optimized layout in accordance with the illustrative embodiments.

FIG. 8 illustrates maintenance operations such as inserting, updating, and deleting data records in the optimized layout in accordance with the illustrative embodiments. Since the complete record is required in a CPU, such as processor unit 206 in FIG. 2, the whole disk page, on which the data is held, is retrieved from the disk, such as disk drive 226 in FIG. 2 (step 800). Then according to the table descriptor, insert, update or delete operations are executed on respective disk blocks in the page (step 802). Finally, the complete page is written back on to the disk (step 804). The process ends thereafter.

Figure 9:
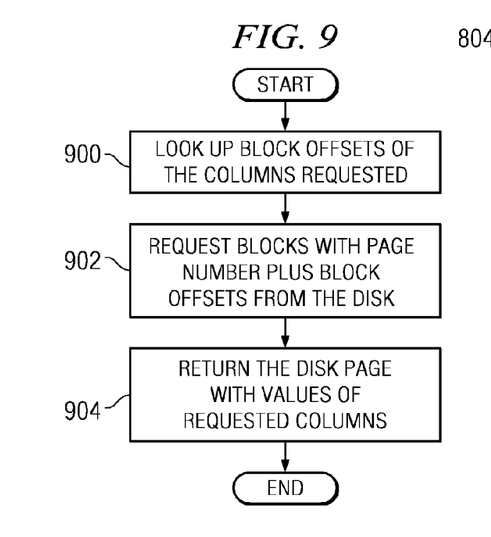
FIG. 9 illustrates query processing steps to retrieve the selected columns required by a query in accordance with the illustrative embodiments.

FIG. 9 illustrates query processing steps to retrieve the selected columns required by a query in accordance with the illustrative embodiments. Using the table meta data in the table descriptor file, the system, such as system 100 in FIG. 1, decides what disk blocks on a page contain the columns requested (step 900). The offsets of the chosen disk blocks to the page identifier are then provided to address and retrieve the desired data (step 902). Finally, the disk page may be reconstructed in memory to fill in null values for non-requested columns (step 904) with the process terminating thereafter. The reconstruction is optional, since database implementation may manage memory objects with reference to pages. However, a partial page may break the existing database implementation so a reconstruction step may be necessary.

Thus, the illustrative embodiments describe a new structured layout on solid state disks. At the database index access component, one can also take advantage of the properties of solid state disks to request multiple, non-sequential index pages at one time. This aggregates multiple index lookup into one.

The illustrative embodiments provide an optimized structured layout of database records to take advantage of the relatively low seek time on solid state disks as compared to hard disks. A key observation is that by only returning values from requested columns, as opposed to disk blocks containing unasked for columns, disk I/O may be significantly reduced to a fraction of the time normally required. This in turn, suggests a database server may significantly speed up in multiples since more data records, each of which is smaller, now flow through disk I/O for query processing without negatively impacting update times. Because of the physical characteristics of a solid state disk, the optimized structured layout of database records is no longer bound to storing records row by row.

Although illustrative embodiments have been described herein with reference to the accompanying drawings, it is to be understood that the invention is not limited to those precise embodiments, and that various other changes and modifications may be affected therein by one skilled in the art without departing from the scope or spirit of the invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for optimizing a database layout on a solid state disk, the computer implemented method comprising:

responsive to a column having a size less than a greatest size of any disk block in the solid state disk, creating, by a data processing system, a plurality of column to disk block assignments by assigning each column of a plurality of columns in a set of data records to one of a plurality of disk blocks on a disk page, wherein each disk block is assigned substantially a same amount of column data by determining an average column size per disk block by calculating a first sum of all column sizes and dividing the first sum by a total number of disk blocks, assigning a column that has a greater size than any disk block to a first unassigned disk block and dividing a remaining part of the column into a second unassigned disk block, and distributing a remaining set of columns across a remaining set of unassigned disk blocks, wherein a column in the remaining set of columns is undivided among multiple disk blocks, and wherein a second sum of an amount of column data of a subset of columns assigned to a disk block is substantially the same amount of column data as the average column size per disk block; and responsive to the column having a size greater than or equal to the greatest size of any disk block, creating, by the data processing system, a multiple disk block assignment if needed for the column.

2. The computer implemented method of claim 1, further comprising:
recording the plurality of column to disk block assignments in a table descriptor, to optimize the database layout.

3. The computer implemented method of claim 2 further comprising:
inserting a data record in the database layout by storing column data of the data record using the column to disk block assignments in the table descriptor.

4. The computer implemented method of claim 2 further comprising:
querying the database layout by determining a block address of a column requested from the table descriptor; and
requesting a disk controller to read only a disk block of the plurality of disk blocks required to retrieve a data query.

5. The computer implemented method of claim 1 further comprising:
deleting a data record from the database layout by removing each column value of the data record from an assigned disk block.

6. The computer implemented method of claim 1 wherein each disk block is assigned substantially the same amount of column data by a user.

7. A computer program product comprising:
a non-transitory computer usable medium storing computer executable program code for optimizing a database layout on a solid state disk, said computer program product comprising:
computer usable program code, responsive to a column having a size less than a greatest size of any disk block in the solid state disk, for creating a plurality of column to disk block assignments by assigning each column of a plurality of columns in a table of data records to one of a plurality of disk blocks on a disk page, wherein each disk block is assigned substantially a same amount of column data by determining an average column size per disk block by calculating a first sum of all column sizes and dividing the first sum by a total number of disk blocks, assigning a column that has a greater size than any disk block to a first unassigned disk block and dividing a remaining part of the column into a second unassigned disk block, and distributing a remaining set of columns across a remaining set of unassigned disk blocks, wherein a column in the remaining set of columns is undivided among multiple disk blocks, and wherein a second sum of an amount of column data of a subset of columns assigned to a disk block is substantially the same amount of column data as the average column size per disk block; and
computer usable program code, responsive to the column having a size greater than or equal to the greatest size of any disk block, for creating a multiple disk block assignment if needed for the column.

8. The computer program product of claim 7, further comprising:
computer usable program code for recording the plurality of column to disk block assignments in a table descriptor, to optimize said database layout.

9. The computer program product of claim 8, further comprising:
computer usable program code for inserting a data record in the database layout by storing column data of a data record using the column to disk block assignments in the table descriptor.

10. The computer program product of claim 8, further comprising:
computer usable program code for querying the database layout by determining a block address of a column requested from the table descriptor; and
computer usable program code for requesting a disk controller to read only a disk block of the plurality of disk blocks required to retrieve a data query.

11. The computer program product of claim 7, further comprising:
computer usable program code for deleting a data record from the database layout by removing each column value of said data record from an assigned disk block.

12. The computer program product of claim 7, wherein defining an even column assignment to disk blocks is accomplished by a user.

13. The computer program product of claim 7, wherein each disk block is assigned substantially the same amount of column data by a user.

14. A data processing system comprising:
a bus system;
a communications system connected to the bus system;
a memory connected to the bus system, wherein the memory includes a set of instructions; and
a processing unit connected to the bus system, wherein the processing unit executes the set of instructions to create a plurality of column to disk block assignments by assigning each column of a plurality of columns in a table of data records to one of a plurality of disk blocks on a disk page in response to a column having a size less than a greatest size of any disk block in a solid state disk, wherein each disk block is assigned substantially the same amount of column data by determining an average column size per disk block by calculating a first sum of all column sizes and dividing the first sum by a total number of disk blocks, assigning a column that has a greater size than any disk block to a first unassigned disk block and dividing a remaining part of the column into a second unassigned disk block, and distributing a remaining set of columns across a remaining set of unassigned disk blocks, wherein a column in the remaining set of columns is undivided among multiple disk blocks, and wherein a second sum of an amount of column data of a subset of columns assigned to a disk block is substantially the same amount of column data as the average column size per disk block; and create a multiple disk block assignment if needed for the column in response to the column having a size greater than or equal to the greatest size of any disk block.

15. The data processing system of claim 14, wherein the processing unit executes a further set of instructions to record the plurality of column to disk block assignments in a table descriptor, to optimize the database layout.

16. The data processing system of claim 15, wherein the processing unit executes a further set of instructions to insert a data record in the database layout by storing column data of the data record using the column to disk block assignments in the table descriptor.

17. The data processing system of claim 15, wherein the processing unit executes a further set of instructions to query the database layout by determining a block address of a column requested from the table descriptor, and request a disk controller to read only a disk block of the plurality of disk blocks required to retrieve a data query.

* * * * *